US007679052B2

(12) United States Patent
Blanchard

(10) Patent No.: US 7,679,052 B2
(45) Date of Patent: Mar. 16, 2010

(54) METHODS OF SEPARATING IONIZED PARTICLES

(75) Inventor: William C. Blanchard, Phoenix, MD (US)

(73) Assignee: KWJ Engineering, Inc., Newark, CA (US)

( * ) Notice: Subject to any disclaimer, the term of this patent is extended or adjusted under 35 U.S.C. 154(b) by 391 days.

(21) Appl. No.: 11/834,806

(22) Filed: Aug. 7, 2007

(65) Prior Publication Data

US 2008/0029440 A1 Feb. 7, 2008

Related U.S. Application Data

(60) Provisional application No. 60/836,092, filed on Aug. 7, 2006.

(51) Int. Cl.
*H01J 49/00* (2006.01)
*B01D 59/44* (2006.01)

(52) U.S. Cl. ....................... 250/282; 250/281; 250/290; 250/292; 250/294

(58) Field of Classification Search ....................... None
See application file for complete search history.

(56) References Cited

U.S. PATENT DOCUMENTS 4,393,719 A * 7/1983 Wiegand et al. .......... 73/861.05
4,797,554 A 1/1989 Blanchard et al.
4,855,595 A 8/1989 Blanchard
5,338,931 A * 8/1994 Spangler et al. ............. 250/287
5,359,196 A 10/1994 Whitt
6,583,407 B1 * 6/2003 Fischer et al. ............... 250/288
6,791,078 B2 9/2004 Giles et al.
6,914,241 B2 7/2005 Giles et al.
6,924,479 B2 8/2005 Blanchard
6,949,739 B2 * 9/2005 Franzen ...................... 250/288
7,034,292 B1 * 4/2006 Whitehouse et al. ........ 250/289
7,122,793 B1 10/2006 Blanchard
7,154,087 B2 12/2006 Giannantonia et al.
7,256,396 B2 * 8/2007 Reilly ........................ 250/288
7,268,347 B1 9/2007 Blanchard
7,361,311 B2 * 4/2008 Cooks et al. ................ 422/100
7,381,373 B2 * 6/2008 Blake et al. ................. 422/100

* cited by examiner

*Primary Examiner*—David A Vanore
(74) *Attorney, Agent, or Firm*—Dinsmore & Shohl LLP

(57) ABSTRACT

Methods of separating ionized particles comprise the step of providing a particle separator comprising a housing, and an electric field disposed inside the housing. The electric field defines a magnitude E (volt/cm) which increases the farther ionized particles travel within the housing. The method further includes delivering a gas flow, wherein the gas flow defines a velocity, Vgas, and delivering ionized particles into the housing, wherein the ionized particles define a mobility value, K ($cm^2$/volt*sec). The product of the mobility value K and the electric field magnitude E define a mobility velocity for the ionized particles, Vmob (cm/sec)=K*E. The method also includes stopping the ionized particles at a location where Vmob is equal and opposite Vgas.

25 Claims, 8 Drawing Sheets

METHODS OF SEPARATING IONIZED PARTICLES

CROSS-REFERENCE TO RELATED APPLICATIONS

This application claims priority from U.S. Provisional Patent Application Ser. No. 60/836,092 filed Aug. 7, 2006, the entire disclosure of which is hereby incorporated by reference herein.

TECHNICAL FIELD

Embodiments of the present invention generally relate to methods of separating ionized particles, and specifically relate to methods of separating ionized particles via particle trapping with an ion mobility spectrometer and related techniques.

BACKGROUND

Ion mobility spectrometry and ion mobility spectrometers are well established. The ion mobility spectrometer (IMS) device may include a sample inlet, ionization region, shutter grid, drift region, and ionized particle detector. Ion mobility spectrometers separate ions according to mobilities through a drift gas in a constant electric field. The ionization and separation processes occur under a wide range of pressures, for example, atmospheric pressure and a wide range of temperatures and drift gas composition. In operation, a uniform or linear field, for example, 200 V/cm, is applied across the drift region and the various ions upon release by the shutter grid or other means are allowed to drift through the drift region toward the ionized particle detector. After release by the shutter grid, the ions of a particular mobility, $K_0$, are located at a particular location in the drift region at each instant of time. The ion detector provides a signal indicative of the number of ions arriving at a collector plate and the time lapse from the time the shutter grid was pulsed open to the time the ions arrive at the collector is an indication of the mobility of the ions collected. For additional details regarding ion mobility spectrometry, U.S. Pat. No. 4,855,595 has been incorporated herein in its entirety by reference. The present inventors have recognized the importance of improved systems and methods which utilize IMS to separate particles, for example, smaller particles of about 0.001 microns.

SUMMARY

According to one embodiment, a method of separating ionized particles is provided. The method comprises providing a particle separator comprising a housing, wherein the housing comprises at least one inlet port, at least one outlet port, and an electric field disposed inside the housing. The electric field defines a magnitude E (volt/cm) which increases the farther ionized particles travel within the housing. The method further includes the steps of delivering a gas flow through the inlet port, wherein the gas flow defines a velocity, Vgas, and delivering ionized particles into the housing. The ionized particles define a mobility value, K ($cm^2$/volt*sec), wherein the product of the mobility value K and the electric field magnitude E define a mobility velocity for the ionized particles, Vmob (cm/sec)=K*E. Moreover, the method comprises stopping ionized particles at a location wherein the mobility velocity Vmob is equal and opposite the gas flow velocity Vgas.

In a further embodiment, the method may include the step of delivering the stopped ionized particles to the particle detector by turning off or adjusting the electric field and transporting the ionized particles with the gas flow.

In another embodiment, the method may further include the steps of providing a particle feed, and ionizing the particle feed by passing the particles through an ionization source before delivering the ionized particles into the particle separator.

In yet another embodiment, the method may include the steps of providing an ionized particle feed, wherein each ionized particle defines a mobility value, K ($cm^2$/volt*sec); setting a desired Ks range for ionized particles; and diverting away from the particle separator ionized particles having K values greater then Ks from being fed to the inlet port.

These and additional objects and advantages provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith. The drawing sheets include.

Figure 1:
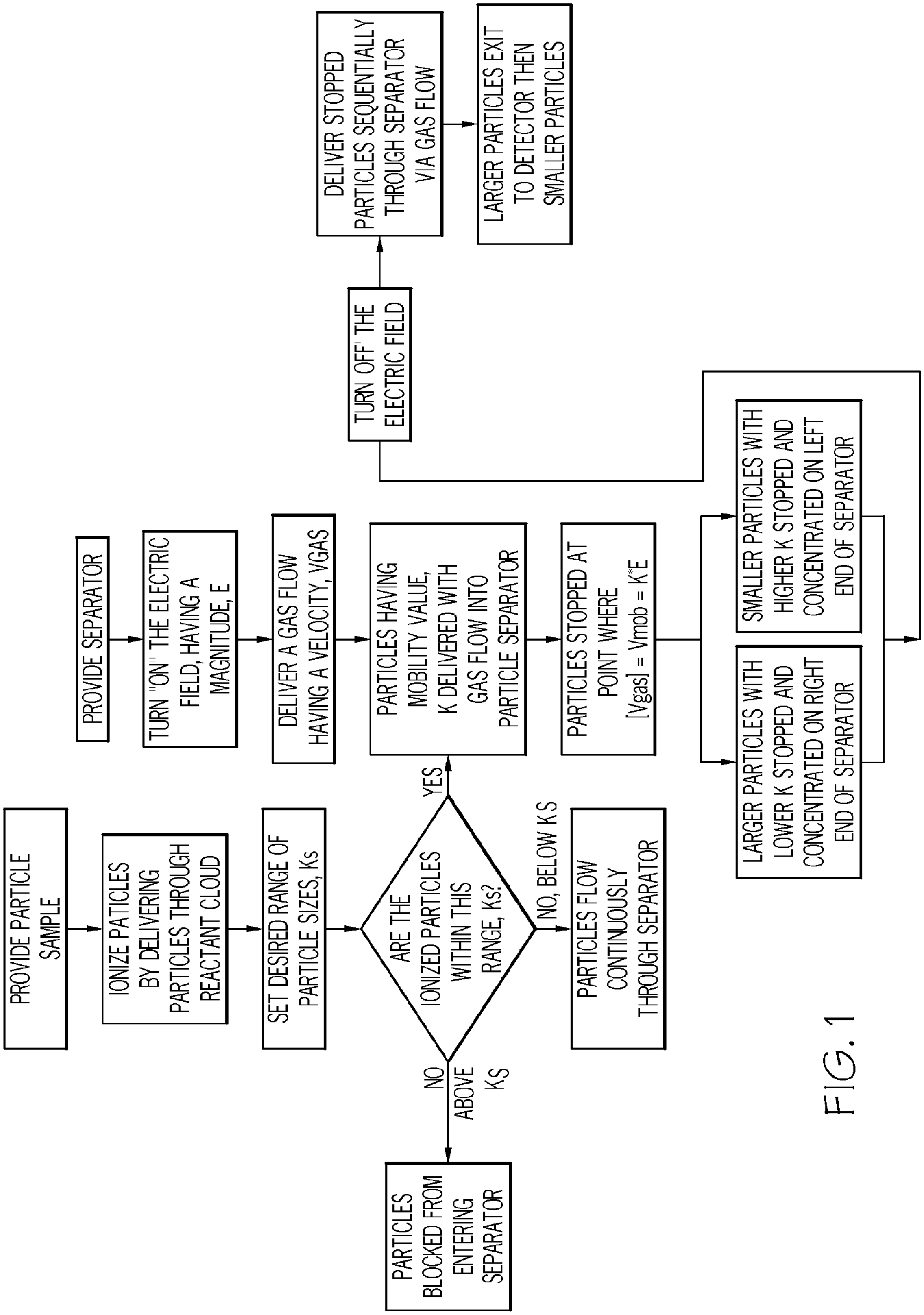
FIG. 1 is a flow chart illustrating embodiments of the method of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

The present invention is directed to methods of separating particles using ion mobility. This particle separator (e.g. an ion mobility spectrometer) uses a gas flow that is constant or changing velocity and an electric field that is neither constant nor continuous in order to trap particles inside the separator to facilitate easier detection. An alternative separator causes the gas flow to be pre-laminar (having a uniform cross-sectional velocity, sometimes called a slug flow) across the structure along with the electric field. The mobility of particles is related to its size, number of charges attached, and other factors such as shape and mass. As used herein, "particle" refers to a molecule or a cluster of molecules or atoms. Particles may range in size from smaller than about 0.001 microns to about 0.05 microns and much larger. Size as used herein may also refer to aerodynamic size. Particles having a size of up to 0.05 microns are usually singularly charged. Ionized bio-products are typically about 0.01 to about 0.005 microns and they may acquire multiple charges. Proteins are typically positively charged, while DNA particles are negatively charged.

Figure 2:
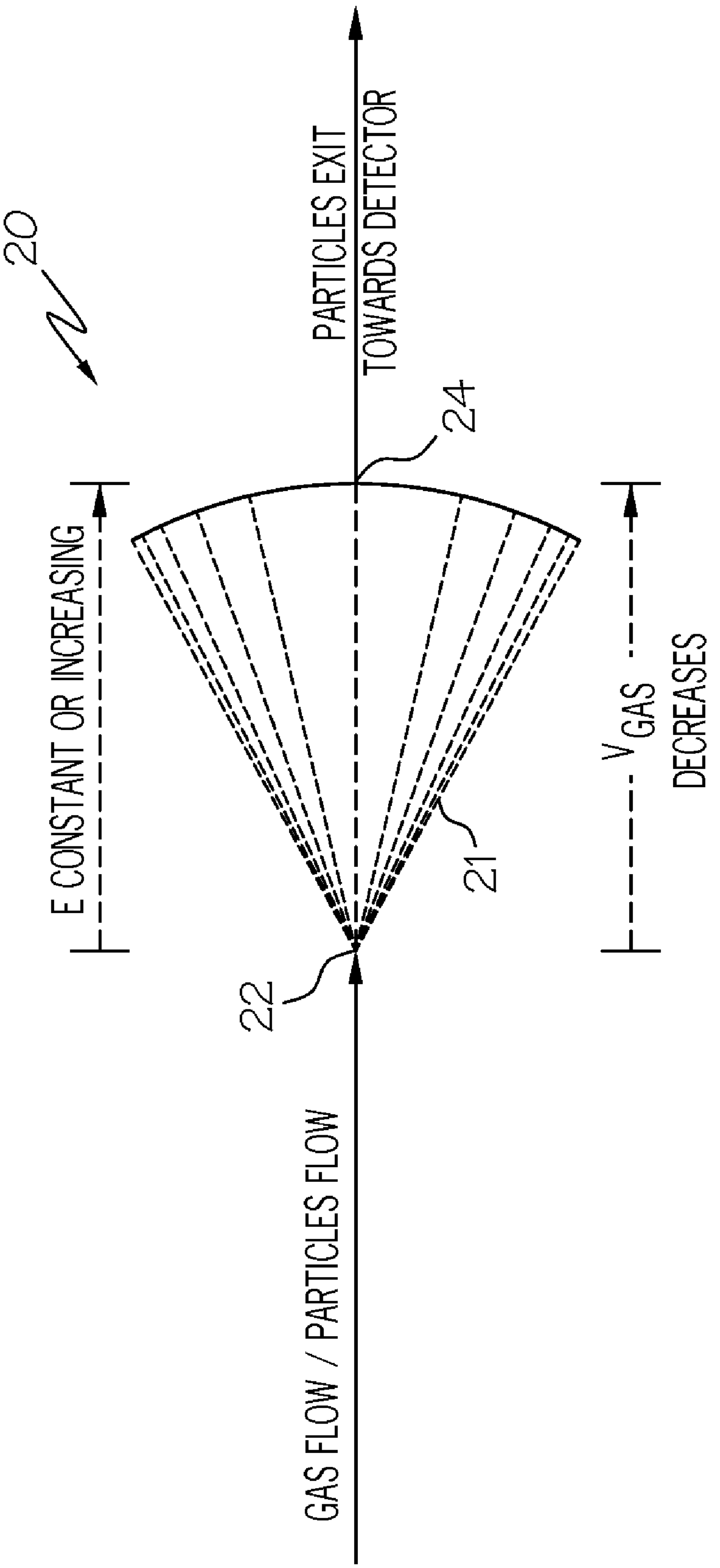
FIG. 2 is a schematic view of a conical particle separator according to one or more embodiments of the present invention.

Referring to FIG. 1, exemplary embodiments of a method for separating ionized particles are provided. The method requires the providing of a particle separator comprising a housing and a particle detector disposed adjacent the housing. The particle separator housing may comprise various shapes and configurations known to one of ordinary skill in the art. In some embodiments, the housing may define varying cross-sections, as shown in the conical shape embodiment 20 of FIG. 2, or a uniform cross-section as shown in the cylindrical shape embodiment 30 of FIG. 3. The conical shape embodiment 20 will be detailed below in the description of varying gas flow, whereas the cylindrical shape embodiment 30 will be detailed below in the context of uniform gas flow (slug flow).

Figure 3:
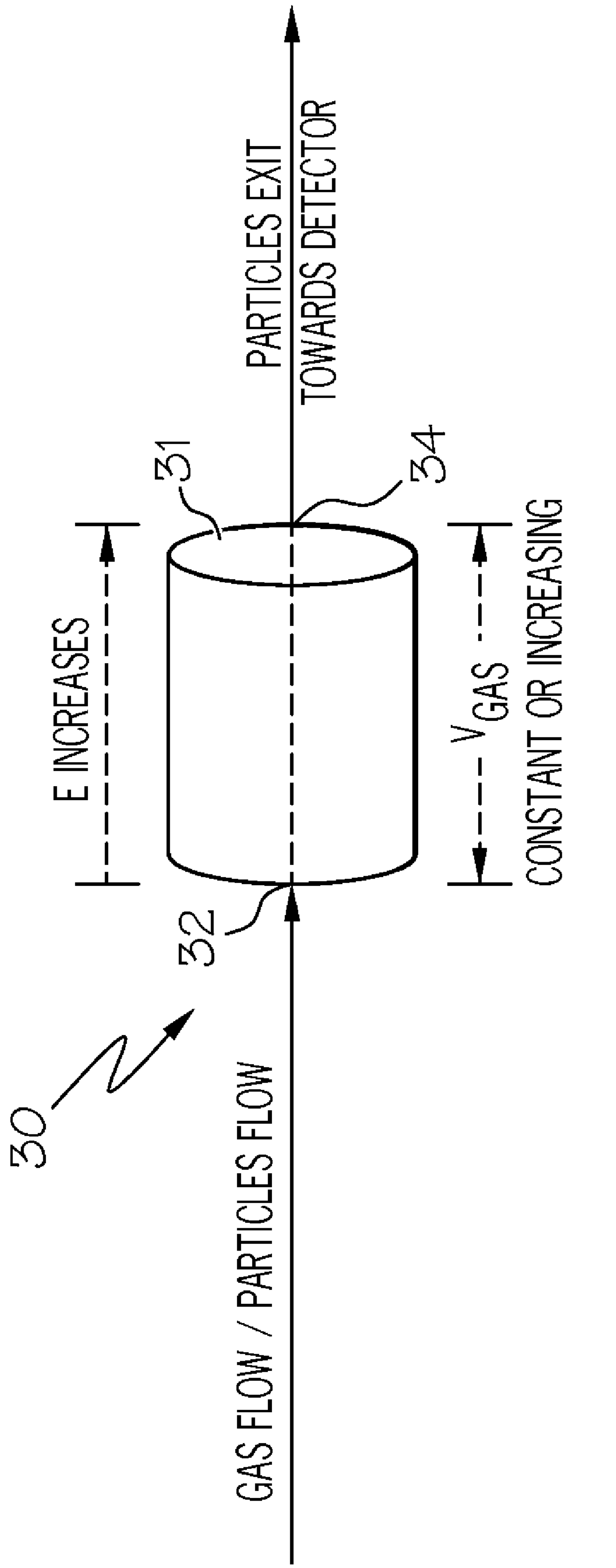
FIG. 3 is a schematic view of a cylindrical particle separator according to one or more embodiments of the present invention.
Figure 4:
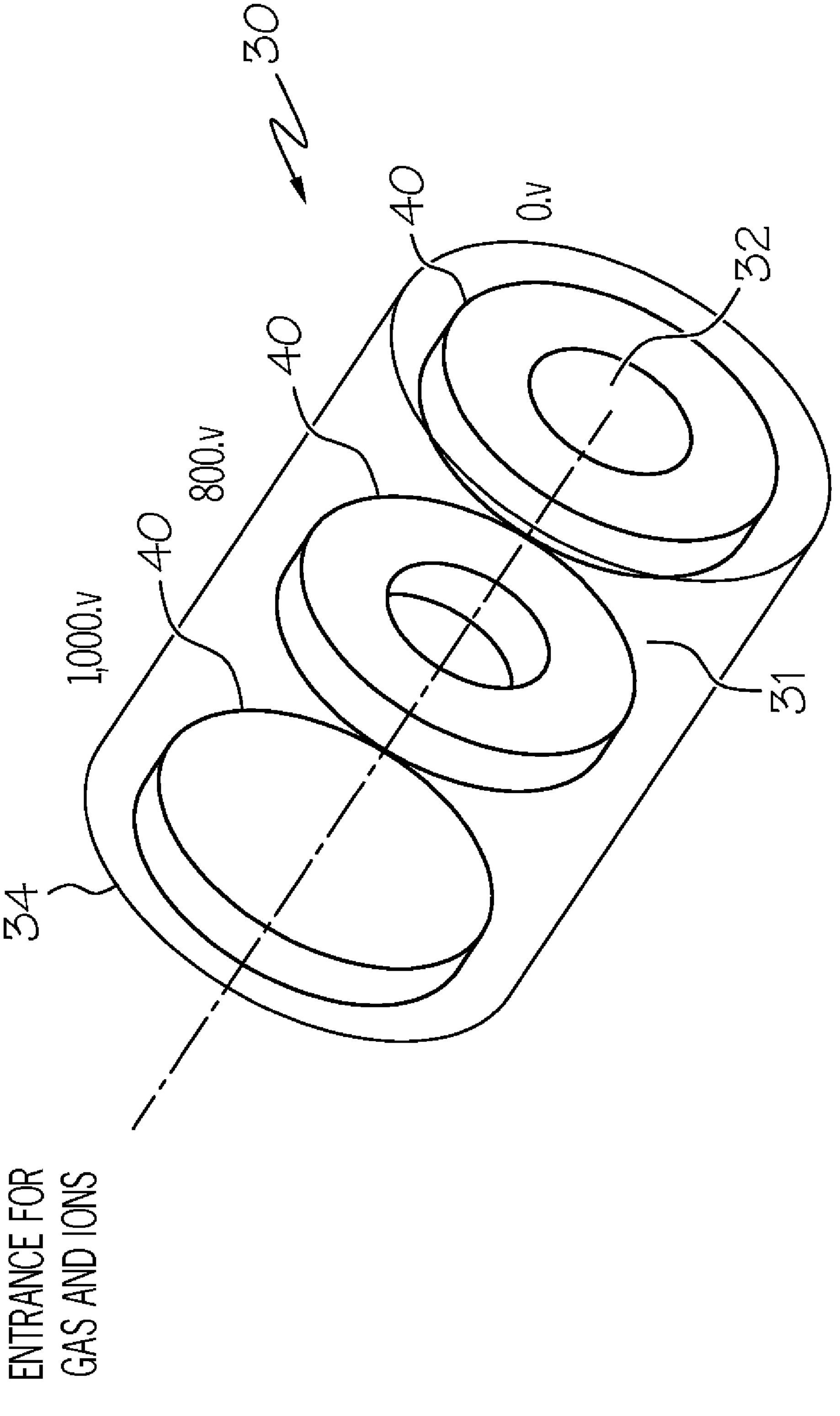
FIG. 4 is a schematic view of an electrode configuration suitable to generate an electric field inside the particle separator housing according to one or more embodiments of the present invention.
Figure 6:
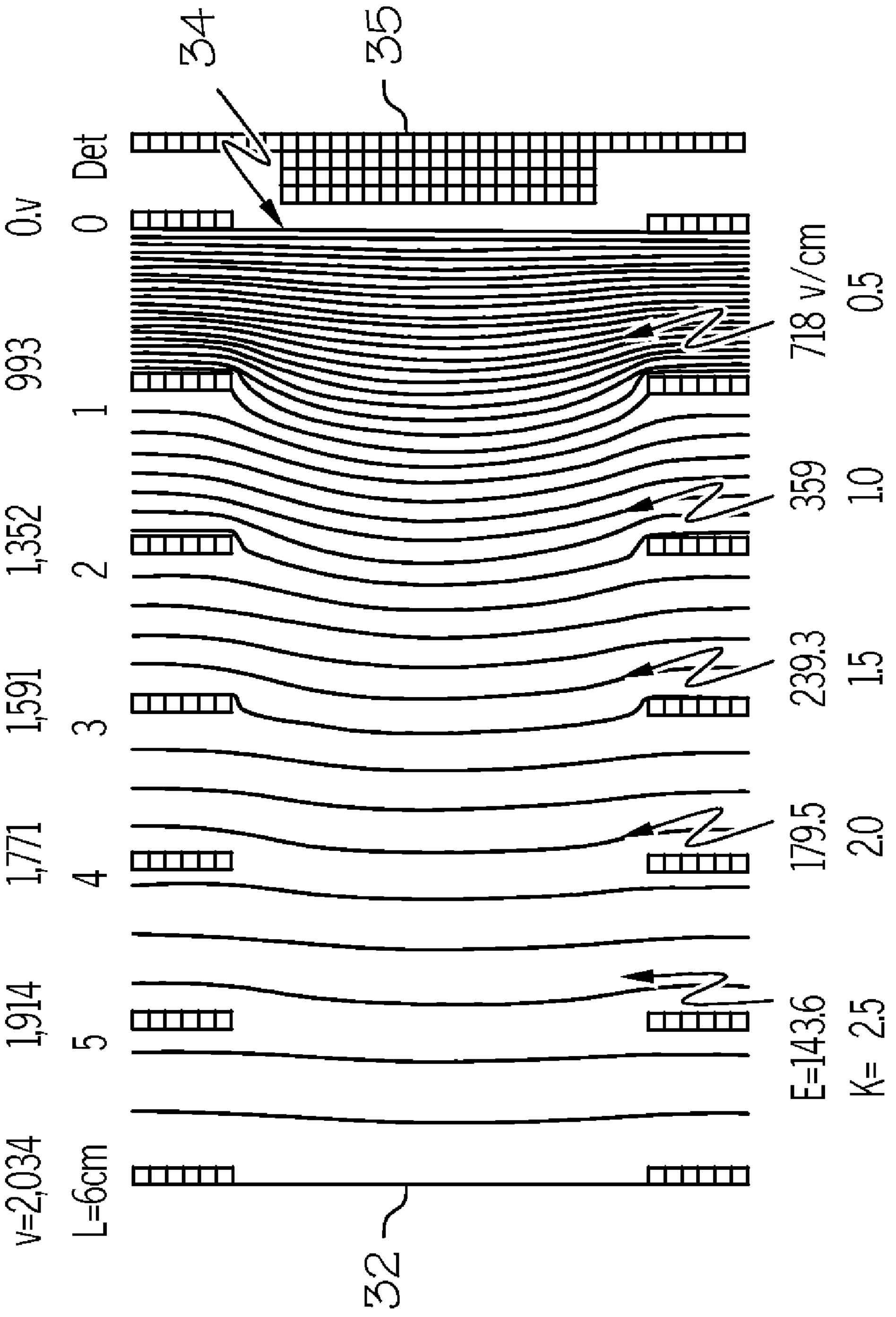
FIG. 6 is a schematic view showing how electric field potentials increase from the inlet to the particle detector according to one or more embodiments of the present invention.
Figure 7:
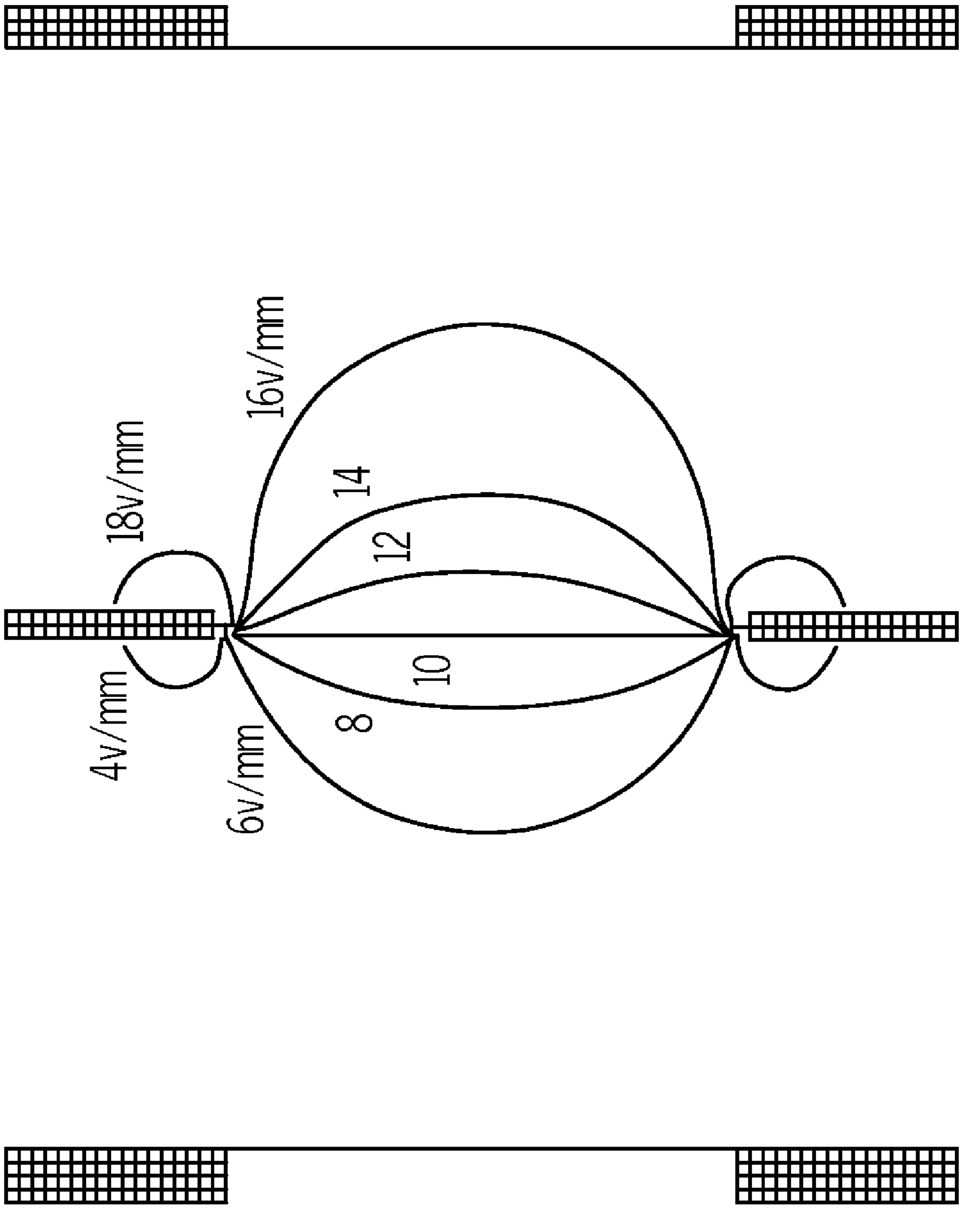
FIG. 7 is a schematic view of electric field gradients inside a particle separator housing according to one or more embodiments of the present invention.
Figure 8:
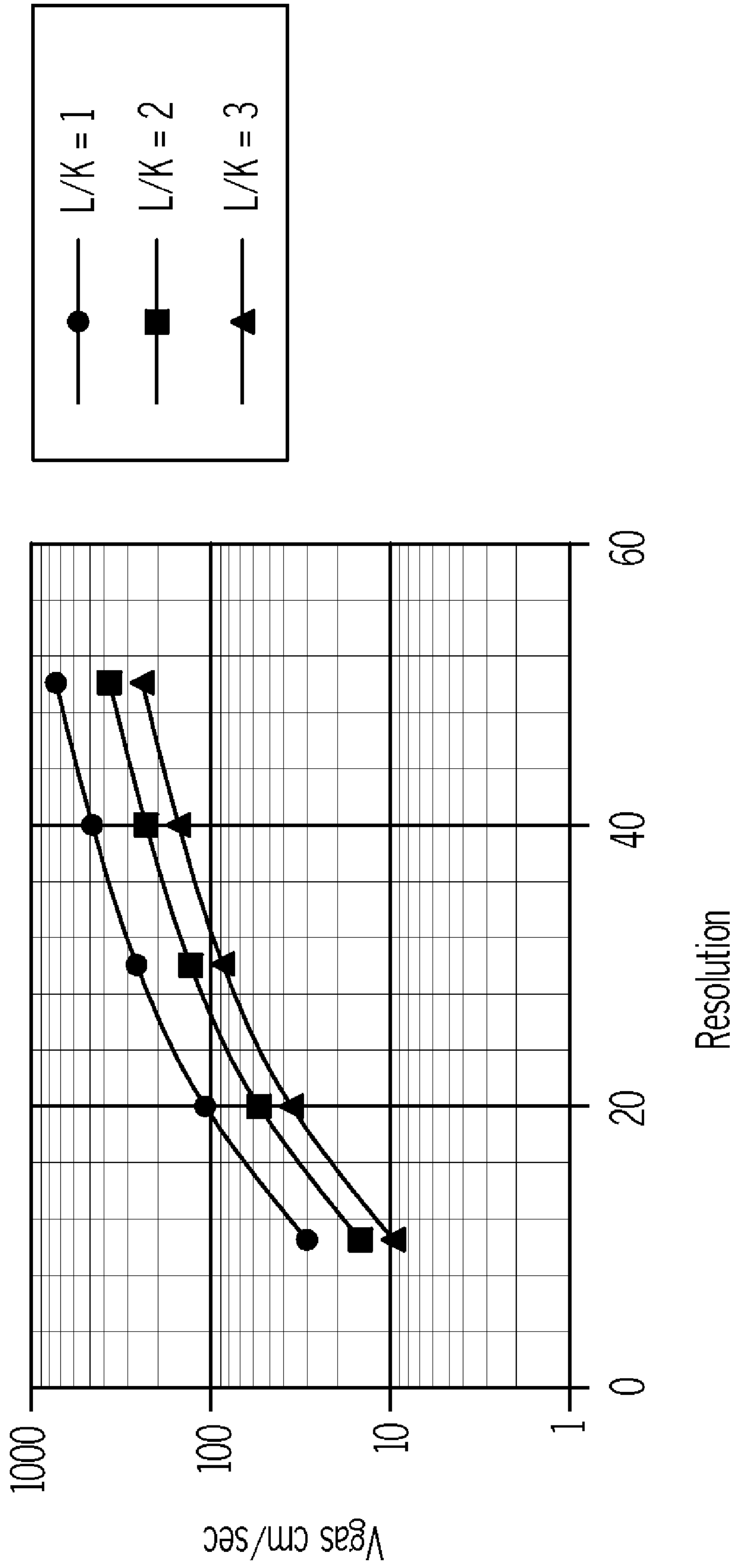
FIG. 8 is a graph illustrating the relationship between gas flow velocity, Vgas, and resolution, R, according to one or more embodiments of the present invention.

Referring to FIG. 3, the housing 31 may also comprise at least one inlet port 32, and at least one outlet port 34. The inlet port 32 is configured to receive the particle feed and the gas flow. To generate the electric field within the housing, the housing comprises various devices coupled to or disposed inside the housing. Referring to the embodiment of FIG. 4, the electric field generation device may comprise a plurality of electrodes 40 arranged in series. As shown in this embodiment, the electric potential increases as the distance from the inlet port increases. When the electric field is "ON", the electric field defines a magnitude E (volts/cm), which increases from the inlet to the detector. This phenomena of increasing electric field potentials is demonstrated in FIG. 6. Further as shown in FIGS. 6 and 7, the electric field may comprise curved lines, straight lines, concave lines, convex lines, or combinations thereof.

Figure 5:
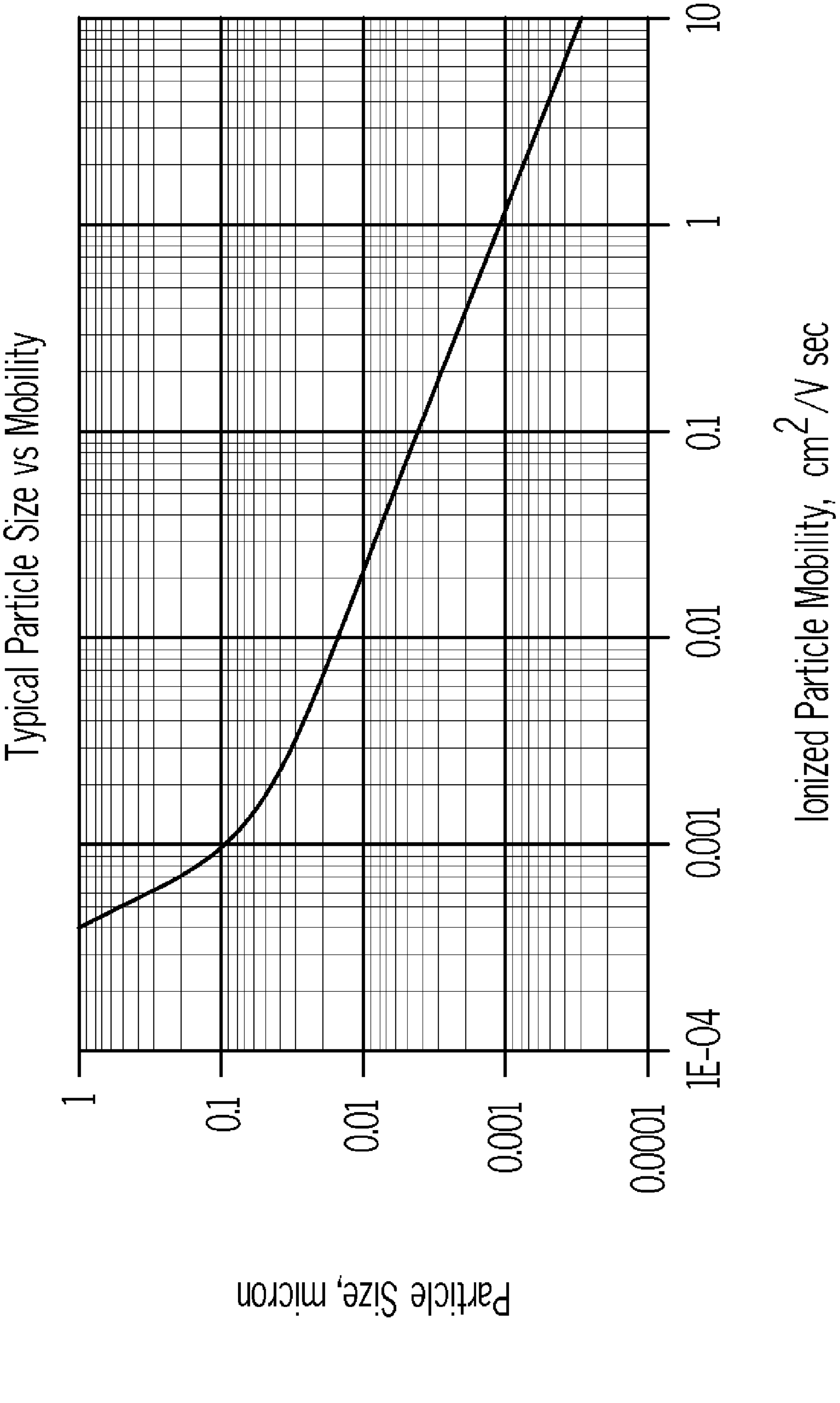
FIG. 5 is a graph illustrating the inverse relationship between particle size and mobility value, K, according to one or more embodiments of the present invention.

In operation, the particle separator 30 of FIG. 3 utilizes a gas flow delivered through the inlet port 32, wherein the gas flow defines a velocity, Vgas. The gas flow may comprise nitrogen, air, or any other gas suitable to transport particles through the separator housing. In one embodiment, the Vgas may be supplied by a fan (not shown) coupled to the housing 31. As described above, the gas flow may be constant or varying throughout the housing 30. Various Vgas linear flow rates are contemplated herein, for example, between about 10 to about 100 cm/sec. Particles are also delivered into the inlet port of the housing 31, and are preferably transported with the Vgas. The ionized particles define a mobility value, K ($cm^2$/volt*sec), which is inversely proportional to particle size as shown in the graph of FIG. 5.

As stated above, slug gas flow occurs when the gas velocity is constant across the cross-section of the structure. A transition to laminar flow occurs after a slug flow enters an enclosed structure such as a tube. Laminar flow is caused by the roughness of the tube surface. The velocity of gas flow at a tube's surface approaches zero as one approaches the tube wall surface. The flow near the tube surface can be forced to be larger than at the center thus yielding a near slug flow profile through a portion of a tube. This particle separation structure can be placed at this portion of the tube when a slug gas flow should be present and the better separation performance should be then observed in this region.

In addition to defining a mobility value K, each ionized particle defines a mobility velocity, Vmob (cm/sec), wherein Vmob is the product of the mobility value K and the electric field magnitude Vmob=K*E. In the particle separator, Vmob is a velocity, which is set up to be opposite the gas flow velocity Vgas. Due to these opposing velocities, an ionized particle is stopped at a location wherein the mobility velocity Vmob is equal to and opposite the gas flow velocity Vgas as shown in equation 1 below $$\vec{V}_{gas}=\overleftarrow{V}_{mob=K\times E} \quad \text{Equation 1}$$

Essentially, the particle stops at a point where the forces of the particle caused by the electric field and by the gas flow are equal and opposite. The distance required to stop an ionized particle increases as the K mobility value decreases. Larger particles with lower K values are stopped a greater distance from the inlet wherein the E magnitude is greater. In contrast, smaller particles with larger K mobility values are stopped closer to the inlet wherein the E magnitude is lesser. As more ionized particles are fed into the housing, particles of the same size and K value concentrate at the same location within the housing. In addition, the particles stopped along the length of the housing may be concentrated in a perpendicular configuration. This may be accomplished by shaping the line of constant electric field and the line of constant gas flow velocity such that the trapped particles move toward the housing's side walls or toward the center line of the housing. In either case, the quantity of particles of similar mobility is concentrated in the same spatial region as additional sample enters the structure. After the desired amount of particles is delivered into the housing, the electric field is turned "OFF". Once the field is turned off, the E magnitude is zero and the Vmob is also zero. Consequently, the Vgas transports the previously stopped particles out of the housing and towards the particle detector. Due to the stopping locations of the particles within the housing, the ionized particles may be delivered sequentially to the particle detector such that the ionized particles with the smallest K value (i.e. particles further from the inlet port) are delivered first to the detector. Also, it is possible to turn the gas flow off and deliver the particles via the electric field forces to a detector at the appropriate end of the particle separation field or just alter (turn up or down or vary) the field and deliver the collected particles in sequence to a detector.

Additionally as shown in the slug flow embodiment FIG. 7, it is shown how shaping electric fields may impact how particles are stopped and separated inside the housing. When the particle is positioned that the Equation 1 is satisfied and the electric field line is bulging to the left, the particle will move along the constant field line (the 6 v/mm) towards the side wall and can be extracted through a hole in the wall where it is lost or can be captured or detected. When the particle is positioned such that Equation 1 is satisfied and the electric field line is bulging to the right, the particle will move along the constant field line (the 16 v/mm) towards the center and be concentrated. When the particle is positioned such that Equation 1 is satisfied and the electric field line is straight (the 10 v/mm) the particles will accumulate along this line and the excess will move to the side wall as dictated by electric forces.

In addition to the uniform gas flow embodiment described above, an alternative structure for the separation of particles which uses a gas flow that varies along the structure will now be briefly described. This may be achieved by flow adjustment but more easily in the conical housing embodiment 20 of FIG. 2. The conical housing 21 comprises a ground plane 25 placed near the end of the cone electrode (not shown) and an inlet port 22 placed at the cone tip for gas and particle feed to enter. The ground plate 25 comprises an outlet port 24 for the ionized particles to exit. This simple structure can provide a decreasing gas flow velocity and a constant or increasing electric field intensity along the center axis of the structure as the particles pass through. The small particles with high Ks values will separate near the cone tip and large particles with low Ks values will separate towards the ground plate 25. When the electric field is turned off, the particles are made to move toward the outlet port 24 in the ground plate. In some cases, a vacuum may be needed to pull the particles (especially those along the sidewalls) through the outlet port 24. Also, additional electric forces of various shapes and magnitudes can be used to effect ion motion.

Before being delivered to the particle separator housing, the ionized particles may, in exemplary embodiments, undergo additional preliminary processing steps as shown in FIG. 1. For example, the particles may be sorted and diverted based on the K mobility value of the particle. This occurs by setting a desired Ks range for ionized particles fed to the reactor. Particles having a K value within the Ks range are separated inside the housing as described above. If the ionized particles have a K value greater than Ks, the particles are prevented from entering the particle separator. For particles having a K value below Ks, the particles will flow directly through the particle separator to the detector without being stopped inside the housing.

Moreover, particles may be ionized prior to entering the reactors. As stated above, the particle feed typically comprises ionized particles; however, it is also contemplated that non-ionized particles may also be fed into the separator. During ionization, a particle feed may pass through an ionization source, which is located adjacent the inlet port of the housing. The ionization source may comprise a plurality of reactant ions that transfer charge to the particles of the particle feed, thereby ionizing the particle(s). The ionization source may comprise any device or medium suitable to transfer charge to a particle feed as would be familiar to one of ordinary skill in the art. In one embodiment, the ionization source may be configured such that the higher reactant ions will be positioned either at or near the inlet port of the housing.

Now that the mechanism of the invention has been described, below is a description of the detection resolution provided by the embodiments of the present invention. Detection resolution, R, for conventional IMS is defined as: the time between the start of the Detection cycle and the detection time (Tdrift), divided by, the time required for the diffused cluster of particles to pass the detector (Full Width time at Half Height, $T_{FWHH}$). It can be shown that with all particles initially located on a plane perpendicular to their travel, i.e. at zero shutter grid time, and at 27° C., $$R = T\text{drift}/T_{FWHH} = 1.87\sqrt{v} \qquad \text{Equation 2}$$

Where v is the voltage used to separate the particles, i.e., the voltage across the drift tube of the IMS, and all particles experience the same v.

According to the embodiments of the present invention, the resolution R involves the field gradient, E, which exists where the particle of K mobility was stopped, as well as the distance L (in cm) that the particle must travel to reach the detector (at the Vgas velocity) after the field is removed.

$$\vec{V}\text{mob} = -\overleftarrow{V}_{gas},\ \vec{V}\text{mob} = K \times E,\ \vec{V}\text{gas} = L/T\text{drift} \qquad \text{Equation 3}$$

Resolution also involves the diffusion of the particles, during the detection cycle. The diffusion coefficient, D, is a function of mobility defined by the equation:

$$D = (K*k*T)/(z*e) \qquad \text{Equation 4}$$

At standard conditions, the diffusion coefficient, D equals K/38.647 $cm^2$/sec, wherein k=1.38$E^{-23}$ joules/° k (Boltzmann's constant), T=300° k, (~27° C.), z=1, and e=1.6$E^{-19}$ coulombs.

The detected signal at full width at half maximum amplitude, w is $$w = \sqrt{16*D*T\text{drift}*\ln(2)} = \sqrt{11.09*D*T\text{drift}}$$

$$T\text{drift} = L/V\text{gas}$$

The time for w to pass the detector, $T_{FWHH}$=w/Vgas

Resolution for this device, with all particles of each K initially located on a plane perpendicular to their travel is defined by:

$$\begin{aligned} R &= Tdrift/TFWHH \qquad \text{Equation 5} \\ &= (L/Vgas)\Big/\left(\sqrt{11.09*D*Tdrift}\Big/Vgas\right) \\ &= L\Big/\sqrt{11.09*(K/38.647)}*(L/Vgas)) \end{aligned}$$

$$R^2 = L^2/((11.09/38.647)*(K*L/Vgas))$$

$$R^2 = 3.485*(L/K)*Vgas$$

$$R^2 = 3.485*E*L, \text{ where } E = v/L$$

The resulting resolution equation (at 27° C.) is R=1.87$\sqrt{v}$, which is same as that achieved in conventional IMS.

Using the prototype apparatus and simulation programs like SIMION, the present inventors have recognized that the present invention yields excellent particle separation. FIG. 6 shows expected equipotential lines from applied voltages given by the simulation program SIMION. The spatial location of a specific particle of specific mobility can be located on the horizontal axis. The time for the particle to reach the detector at the Vgas velocity, i.e. if the field is removed and the particle is free to flow with the gas at velocity Vgas, can thus be computed as shown. Signal shape is changed by diffusion and other forces may be calculated, which then enables the resolution and other analytical parameters to be predicted. and we can estimate its analytical capability for given particles, molecules, and atoms.

It is noted that terms like "specifically," "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention. For example, it is contemplated that the invention may be used outside the stated target range of particles by altering the conditions, geometry, or method applied during the particle separation process.

What is claimed is:

1. A method of separating ionized particles comprising:

providing a particle separator comprising a housing, wherein the housing comprises at least one inlet port, at least one outlet port, and an electric field disposed inside the housing, wherein the electric field defines a magnitude E (volt/cm) which increases the farther ionized particles travel within the housing;

delivering a gas flow through the inlet port, wherein the gas flow defines a velocity, Vgas;

delivering ionized particles into the housing, the ionized particles defining a mobility value, K ($cm^2$/volt*sec), wherein the product of the mobility value K and the electric field magnitude E define a mobility velocity for the ionized particles, Vmob (cm/sec)=K*E; and separating the ionized particles by stopping each ionized particle at a location in the separator wherein the mobility velocity, Vmob, of the ionized particles is equal and opposite the gas flow velocity Vgas.

2. A method according to claim 1 further comprising delivering the stopped ionized particles to a particle detector adjacent the housing or another detection means after separation in the particle separator.

3. A method according to claim 2 wherein the stopped ionized particles are delivered to the detector by turning off the electric field, lowering or adjusting the strength of the electric field, or increasing the gas flow inside the detector.

4. A method according to claim 1 wherein the particle separator is an ion concentrator, an IMS analyzer, or combinations thereof.

5. A method according to claim 1 wherein the particle detector is located on the at least one inlet port, the at least one outlet port, along the separator, or combinations thereof.

6. A method according to claim 1 wherein ionized particles of the same size and K mobility value concentrate at the same stopping location within the housing.

7. A method according to claim 1 wherein the distance required to stop an ionized particle increases as the K mobility value decreases.

8. A method according to claim 1 wherein the size of an ionized particle increases as the K mobility value decreases.

9. A method according to claim 1 wherein the ionized particles are delivered sequentially to the particle detector such that the ionized particles with the smallest K value are delivered first.

10. A method according to claim 1 further comprises forcing the particles towards at least one side wall of the housing by shaping the electric field lines.

11. A method according to claim 1 wherein Vgas is between about 10 to about 100 cm/sec.

12. A method according to claim 1 wherein the housing defines a varying cross-section.

13. A method according to claim 1 wherein the housing defines a cylindrical or conical shape.

14. A particle separator configured to utilize the method of claim 1.

15. A method according to claim 1 wherein the electric field comprises curved lines, straight lines, concave lines, convex lines, or combinations thereof.

16. A method according to claim 1 wherein the electric field is continuous, variable, linear, nonlinear, or combinations thereof.

17. A method according to claim 1 wherein the fluid flow defines a laminar flow or slug flow.

18. A method according to claim 1 wherein the particles are approximately 0.05 microns or smaller, and are singularly charged.

19. A method according to claim 1 wherein small particles comprise a size of about 0.001 microns of molecular dimensions.

20. A method of separating ionized particles comprising providing a particle feed;

ionizing the particle feed by using an ionization source;

providing a particle separator comprising a housing, wherein the housing comprises at least one inlet port, at least one outlet port, and an electric field disposed inside the housing, wherein the electric field defines a magnitude E (volt/cm);

delivering a gas flow through the inlet port, wherein the gas flow defines a velocity, Vgas;

delivering ionized particles into the housing, the ionized particles defining a mobility value, K ($cm^2$/volt*sec), wherein the product of the mobility value K and the electric field magnitude E define a mobility velocity for the ionized particles, Vmob (cm/sec)=K*E;

stopping ionized particles at a location wherein the mobility velocity Vmob is equal and opposite the gas flow velocity Vgas; and delivering the stopped ionized particles to the particle detector.

21. A method of separating ionized particles according to claim 20 further comprising delivering the stopped ionized particles to a particle detector adjacent the housing or another detection means after separation in the particle separator.

22. A method according to claim 20 wherein the ionization source comprises a plurality of reactant ions that transfer charge to the particles of the particle feed.

23. The method of claim 20 wherein the particles are controlled back and forth inside the field to effectuate additional separation prior to detection.

24. A method of separating ionized particles comprising providing a particle separator comprising a housing, wherein the housing comprises at least one inlet port, at least one outlet port, a particle detector disposed on the at least one outlet port, and an electric field inside the housing, wherein the electric field defines a magnitude E (volt/cm) which increases the farther ionized particles travel within the housing;

providing an ionized particle feed, wherein each ionized particle defines a mobility value, K ($cm^2$/volt*sec);

setting a desired Ks range for ionized particles;

diverting away from the particle separator ionized particles having K values greater then Ks from being fed to the inlet port;

delivering a gas flow through the inlet port, wherein the gas flow defines a velocity, Vgas;

delivering ionized particles with the gas flow into the housing, the ionized particles defining a mobility value, K ($cm^2$/volt*sec), wherein the product of the mobility value K and the electric field E define a mobility velocity for the ionized particles, Vmob (cm/sec)=K*E;

stopping ionized particles at a location wherein the mobility velocity Vmob is equal and opposite the Vgas; and delivering the stopped ionized particles to the particle detector by turning off the electric field and transporting the ionized particles with the gas flow.

25. A method according to claim 24 wherein particles having a K value below Ks flow directly to the particle detector without being stopped inside the housing.

* * * * *